(12) United States Patent
Lu et al.

(10) Patent No.: US 7,117,510 B2
(45) Date of Patent: Oct. 3, 2006

(54) MULTI-MEDIA PLAYER HAVING A ROTATABLE PANEL THAT CAN BE RESTORED AUTOMATICALLY

(75) Inventors: Kun-Feng Lu, Sindian (TW); Wei-Kang Kan, Banciao (TW)

(73) Assignee: Giga-Byte Technology Co., Ltd., Taipei (TW)

( * ) Notice: Subject to any disclaimer, the term of this patent is extended or adjusted under 35 U.S.C. 154(b) by 387 days.

(21) Appl. No.: 10/756,335

(22) Filed: Jan. 14, 2004

(65) Prior Publication Data

US 2005/0155049 A1    Jul. 14, 2005

(51) Int. Cl.
*G11B 33/02* (2006.01)
(52) U.S. Cl. ..................................... 720/647
(58) Field of Classification Search ............... 720/600, 720/646, 647; 369/75.1–77.21, 178, 191, 369/192; 248/27.1; 455/345, 348; 361/814, 361/826, 681
See application file for complete search history.

(56) References Cited

U.S. PATENT DOCUMENTS 5,953,302 A * 9/1999 Kobayashi ............... 720/647
2003/0193871 A1* 10/2003 Tobishima et al. ......... 369/75.1

* cited by examiner

*Primary Examiner*—Allen Cao
(74) *Attorney, Agent, or Firm*—Rosenberg, Klein & Lee (57) ABSTRACT

A multi-media player includes a main frame, and a rotatable panel rotatably mounted on the main frame and including a mounting plate secured on the main frame and formed with a window, and a casing rotatably mounted on the mounting plate and rotatable between a first position where the casing is rested on the mounting plate and a second position where the casing is removed from the mounting plate to expose the window of the mounting plate. When the casing is moved from the first position to the second position, the casing stores a restoring force to provide an automatic restoring function. Thus, the rotatable panel can be restored automatically.

14 Claims, 7 Drawing Sheets

FIG. 7

MULTI-MEDIA PLAYER HAVING A ROTATABLE PANEL THAT CAN BE RESTORED AUTOMATICALLY

BACKGROUND OF THE INVENTION

1. Field of the Invention

The present invention relates to a multi-media player, and more particularly to a multi-media player having a rotatable panel that can be restored automatically.

2. Description of the Related Art

A conventional multi-media player, such as a VCD or DVD player, mounted on the computer comprises a main frame, a retractable tray movably mounted in the main frame for carrying a portable storage medium, such as a VCD or DVD, and a cover plate that is pivoted relative to the main frame to cover or open the retractable tray. However, the cover plate is only used to cover or open the retractable tray without having other additional functions, thereby limiting the versatility of the cover plate. In addition, the cover plate is not operated easily, thereby causing inconvenience to the user.

SUMMARY OF THE INVENTION

The present invention is to mitigate and/or obviate the disadvantage of the conventional multi-media player.

The primary objective of the present invention is to provide a multi-media player having a rotatable panel.

Another objective of the present invention is to provide a multi-media player having a rotatable panel that can be restored automatically.

A further objective of the present invention is to provide a multi-media player, wherein the rotatable panel has a rotatable function to cover or detach from the receiving portion of the main frame.

In accordance with the present invention, there is provided a multi-media player, comprising:

a main frame; and a rotatable panel rotatably mounted on the main frame and including:

a mounting plate secured on the main frame and formed with a window; and a casing rotatably mounted on the mounting plate and rotatable between a first position where the casing is rested on the mounting plate and a second position where the casing is removed from the mounting plate to expose the window of the mounting plate, wherein:

when the casing is moved from the first position to the second position, the casing stores a restoring force to provide an automatic restoring function.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1–5, a multi-media player, such as a VCD or DVD player, in accordance with the preferred embodiment of the present invention comprises a main frame 1, and a rotatable panel 2 rotatably mounted on the main frame 1.

Figure 1:
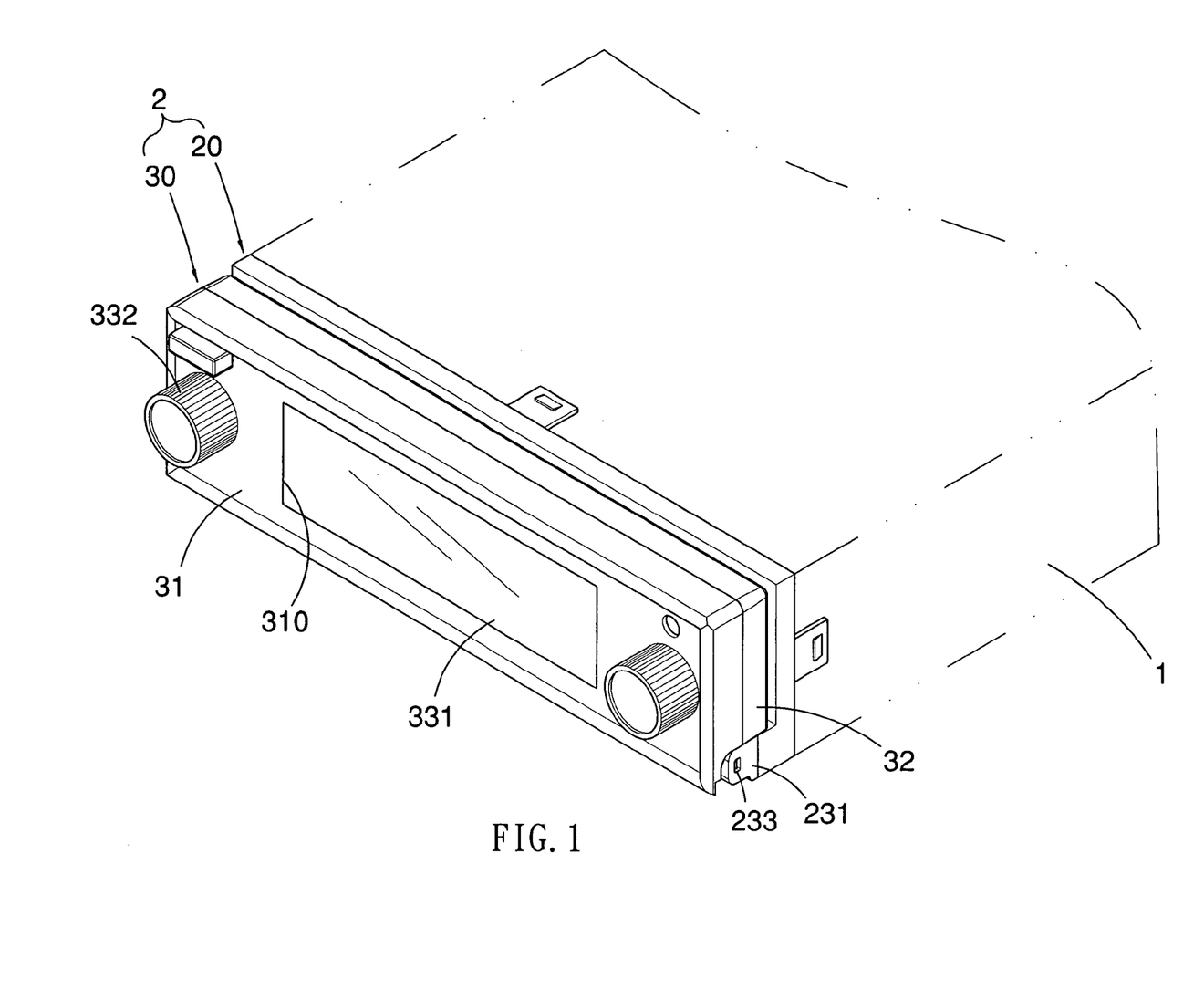
FIG. 1 is a partially cut-away perspective view of a multi-media player in accordance with the preferred embodiment of the present invention.
Figure 2:
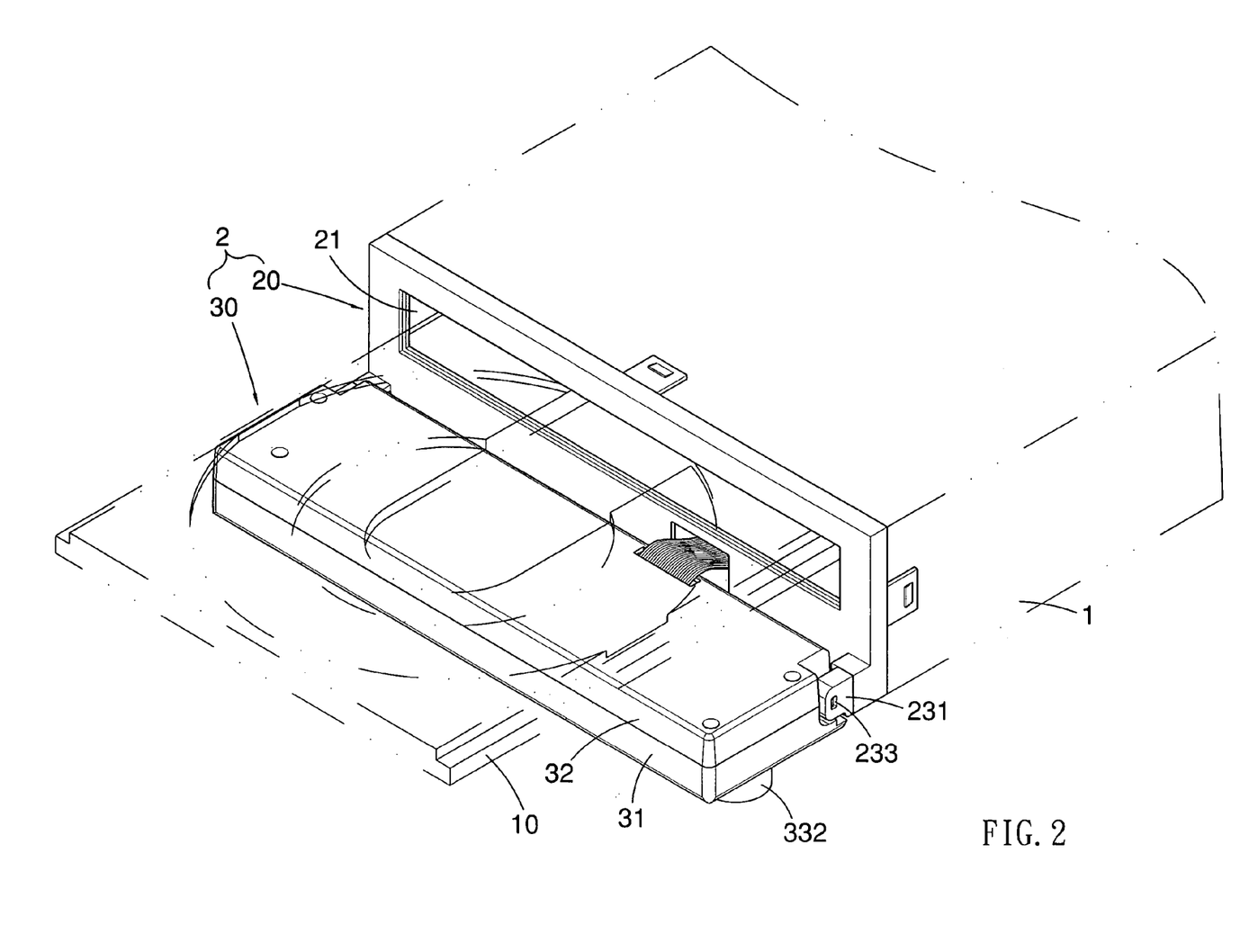
FIG. 2 is a schematic operational view of the multi-media player as shown in FIG. 1.
Figure 3:
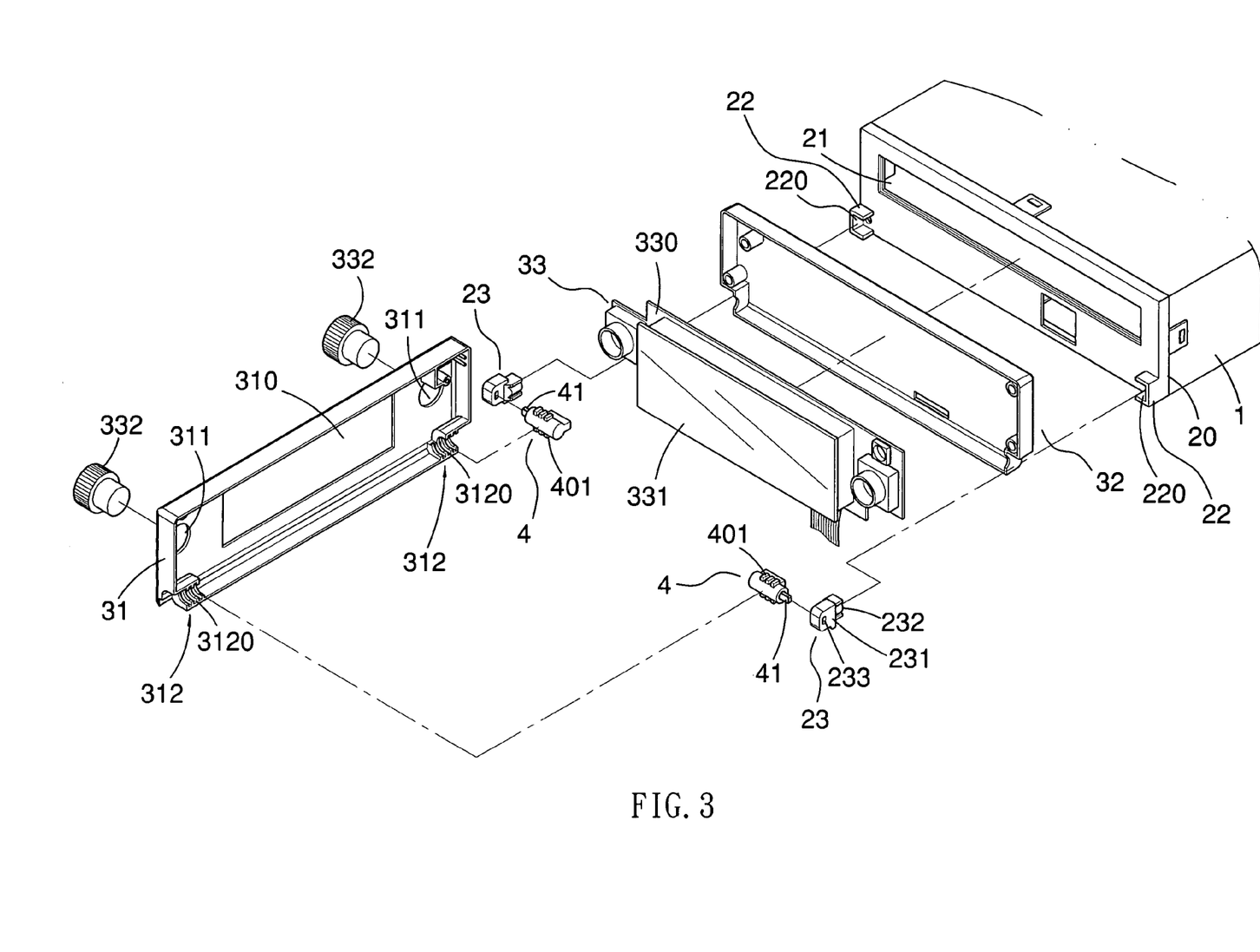
FIG. 3 is an exploded perspective view of the multi-media player as shown in FIG. 1.

The main frame 1 is provided with a retractable receiving portion 10 for carrying a portable storage medium, such as a VCD or DVD. Preferably, the receiving portion 10 of the main frame 1 is a retractable tray.

The rotatable panel 2 includes a mounting plate 20 secured on the main frame 1, and a casing 30 rotatably mounted on the mounting plate 20.

The mounting plate 20 is formed with a window 21 aligning with the receiving portion 10 of the main frame 1 for passage of the receiving portion 10.

The casing 30 includes a first plate 31, a second plate 32 combined with the first plate 31, and an electronic device 33 mounted between the first plate 31 and the second plate 32.

The first plate 31 of the casing 30 is formed with a window 310.

The electronic device 33 includes a circuit board 330, an indicator 331, and two control switches 332.

The circuit board 330 is electrically connected to the main frame 1 to control operation of the multi-media player.

The indicator 331 is mounted on the circuit board 330 and is flush with the window 310 of the first plate 31. The indicator 331 is preferably a liquid crystal display (LCD) to indicate the operation condition of the multi-media player.

The first plate 31 is formed with two through holes 311 for mounting the two control switches 332. Each of the two control switches 332 is mounted on the circuit board 330. The two control switches 332 are preferably a volume control button and a frequency modulation button to control the playing functions of the multi-media player.

The casing 30 is rotatable between a first position where the second plate 32 of the casing 30 is rested on the mounting plate 20 rigidly and stably as shown in FIG. 1 and a second position where the second plate 32 of the casing 30 is removed from the mounting plate 20 to wholly expose the window 21 of the mounting plate 20 as shown in FIG. 2.

In brief, the casing 30 forms an operation panel that can indicate the operation condition of the multi-media player and can also control the playing functions of the multi-media player. In addition, the casing 30 has a rotatable function to cover or detach from the receiving portion 10 of the main frame 1.

The mounting plate 20 is formed with two opposite mounting portions 22 each formed with a mounting recess 220. The rotatable panel 2 further includes two connecting portions 23 each secured on a respective one of the two mounting portions 22 of the mounting plate 20 and each including a first block 231 formed with a fixing hole 233, and a second block 232 integrally formed on the first block 231 and inserted into the mounting recess 220 of a respective one of the two mounting portions 22. The fixing holes 233 of the first blocks 231 of the two connecting portions 23 are co-axial with each other.

The rotatable panel 2 further includes two restoring devices 4 each mounted between the first plate 31 of the casing 30 and a respective one of the two connecting portions 23 to provide a restoring effect to return the casing 30 to the original position.

Figure 4:
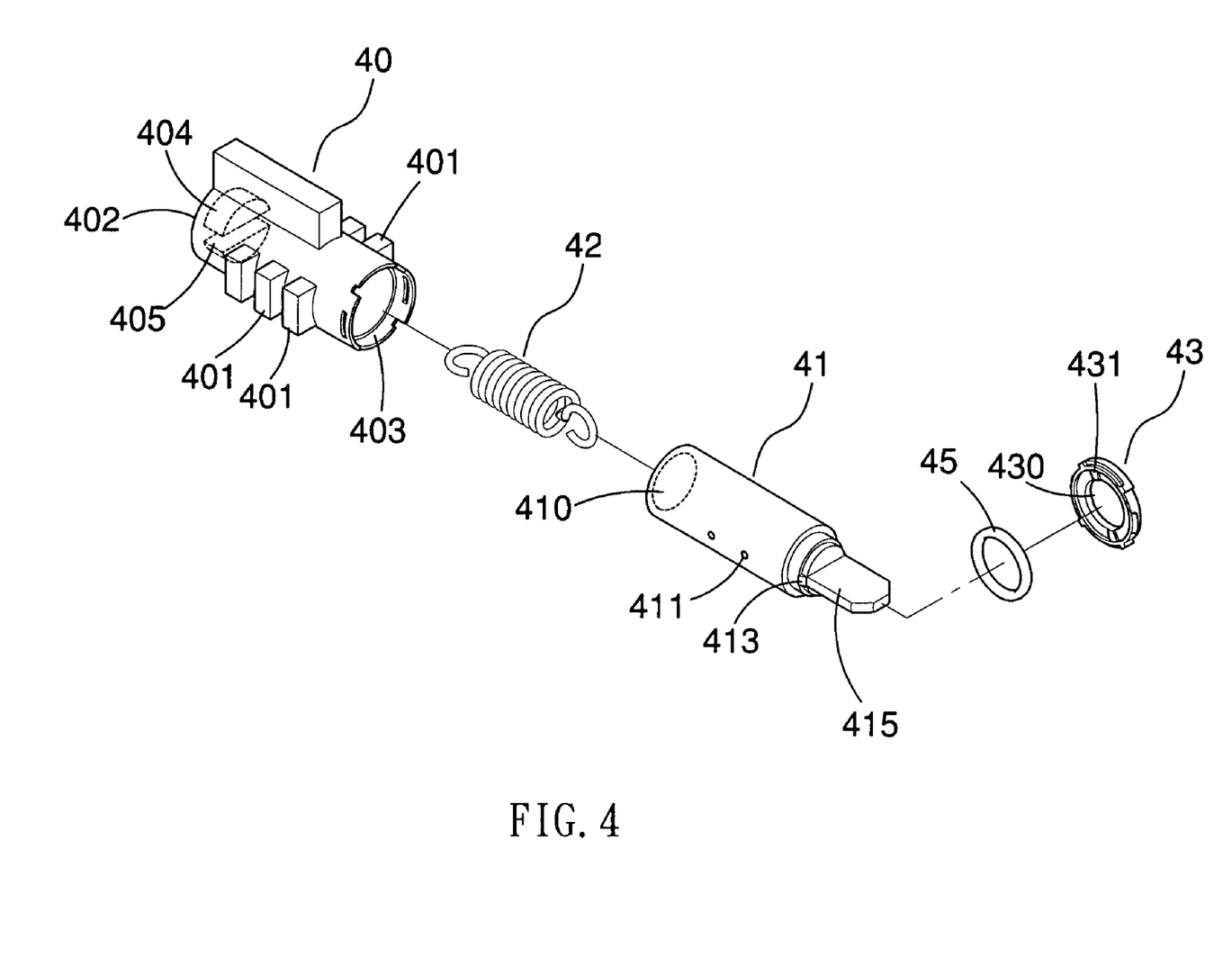
FIG. 4 is an exploded perspective view of a restoring device of the multi-media player in accordance with the preferred embodiment of the present invention.

The first plate 31 is formed with two opposite fixing members 312 each formed with a plurality of fixing recesses 3120. Each of the two restoring devices 4 includes a shaft 41 fixed on a respective one of the two connecting portions 23, a rotation barrel 40 secured on a respective one of the two fixing members 312 of the first plate 31 and rotatably mounted on the shaft 41, and an elastic member 42 mounted in the shaft 41 and urged between the rotation barrel 40 and the shaft 41.

The shaft 41 has a distal end formed with a plug 415 protruded outward from the fixing barrel 40 and fixed in the fixing hole 233 of a respective one of the two connecting portions 23. The shaft 41 has an inside formed with a chamber 410 for receiving the elastic member 42 and has a periphery formed with a plurality of through holes 411 each communicating with the chamber 410.

The rotation barrel 40 has a periphery formed with a plurality of fixing blocks 401 each fixed in a respective one of the fixing recesses 3120 of the respective fixing member 312 of the first plate 31. The rotation barrel 40 is formed with an opening 403 for receiving the shaft 41.

Figure 5:
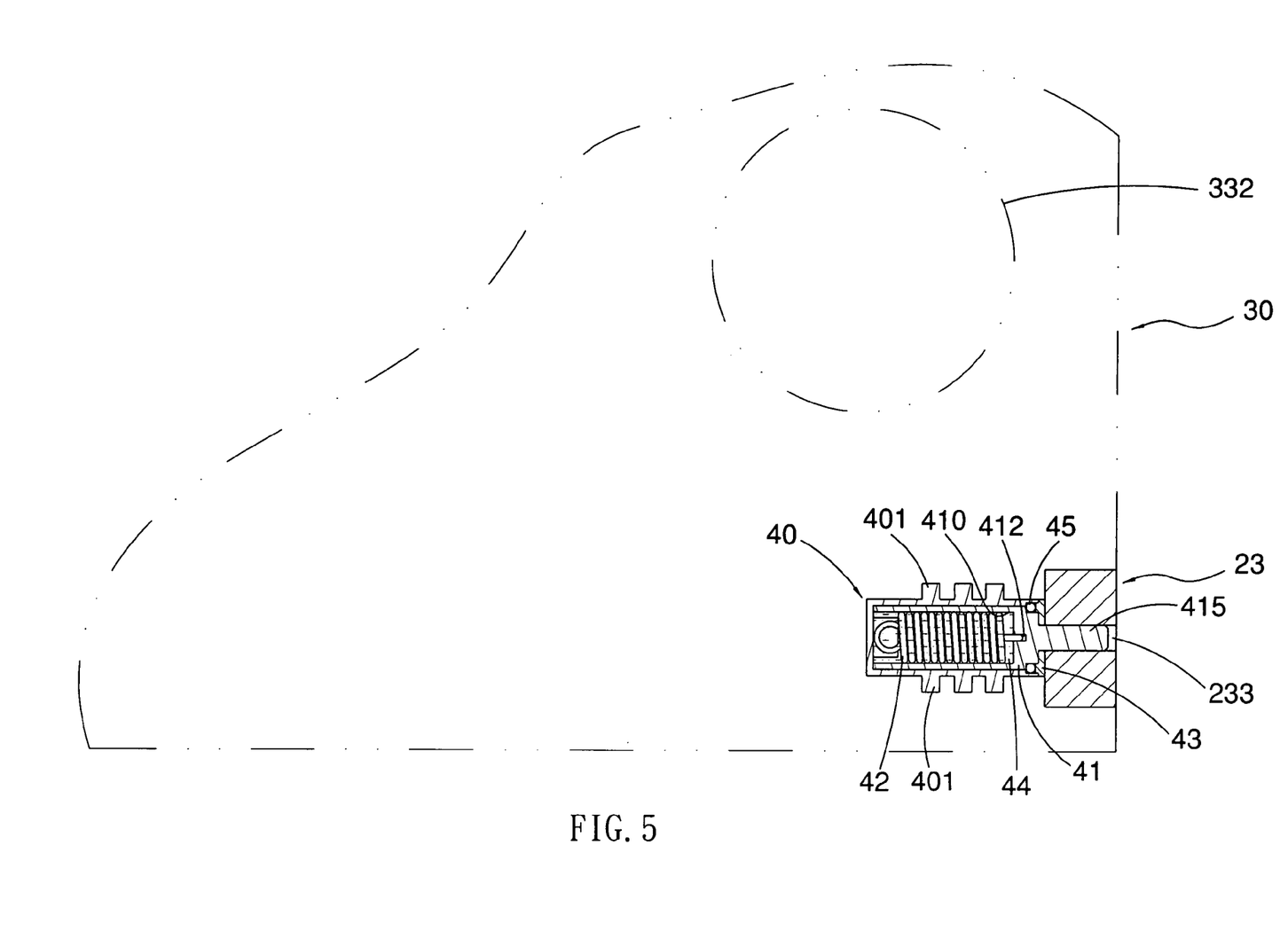
FIG. 5 is a partially front plan cross-sectional view of the multi-media player as shown in FIG. 1.

The chamber 410 of the shaft 41 has an end face formed with a fixing groove 412 (see FIG. 5). The opening 403 of the rotation barrel 40 has an end face 402 formed with a fixing stud 404 formed with a fixing groove 405. The elastic member 42 has a first end fixed in the fixing groove 412 of the shaft 41 and a second end fixed in the fixing groove 405 of the rotation barrel 40.

Each of the two restoring devices 4 further includes a viscous body 44 mounted between the rotation barrel 40 and the shaft 41, a cover 43 fixed in the opening 403 of the rotation barrel 40 to rotate therewith and formed with a through hole 430 for passage of the plug 415 of the shaft 41, and an O-ring 45 urged between the rotation barrel 40 and the shaft 41 to seal the viscous body 44. Preferably, the viscous body 44 is a greasy oil to provide a damping effect between the rotation barrel 40 and the shaft 41.

The cover 43 has an inner wall formed with two opposite positioning blocks 431, and the shaft 41 has a periphery formed with two opposite catch blocks 413 to stop movement of the positioning blocks 431 of the cover 43 to prevent the elastic member 42 from being distorted or deformed excessively due to an excessive rotation of the rotation barrel 40.

Figure 6:
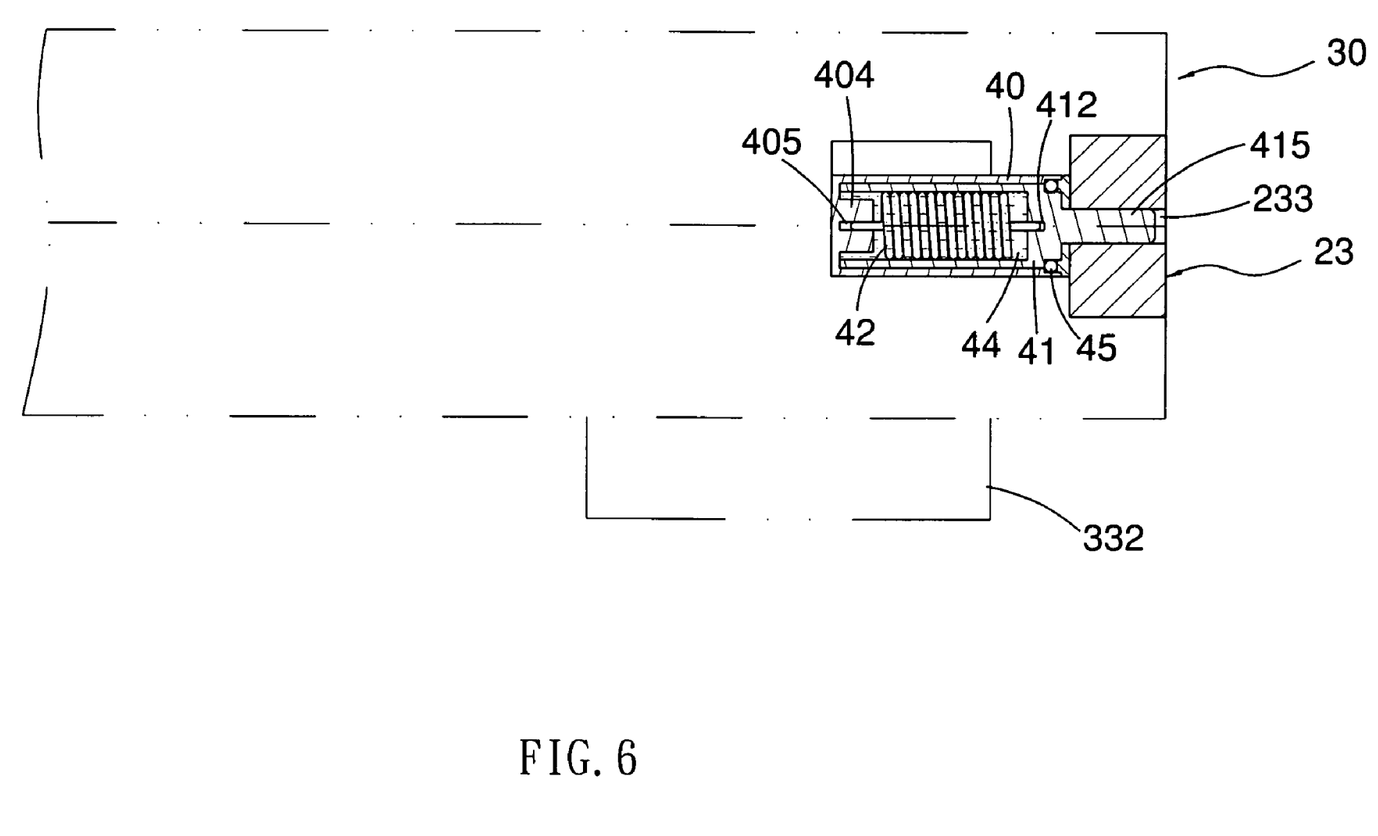
FIG. 6 is a schematic operational view of the multi-media player as shown in FIG. 5.

In operation, when the casing 30 is rotated relative to the mounting plate 20, the rotation barrel 40 is rotated on the shaft 41 to move from the position as shown in FIG. 5 to the position as shown in FIG. 6, so that the elastic member 42 is distorted during movement of the casing 30 to store a restoring force.

Figure 7:
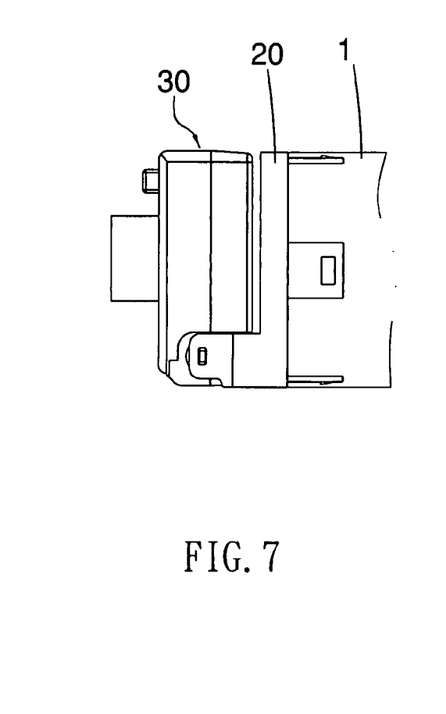
FIG. 7 is a partially side plan view of the multi-media player as shown in FIG. 1.
Figure 8:
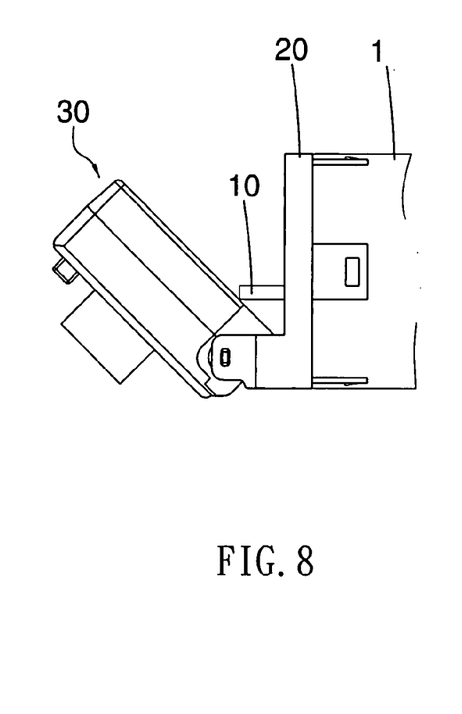
FIG. 8 is a schematic operational view of the multi-media player as shown in FIG. 7.
Figure 9:
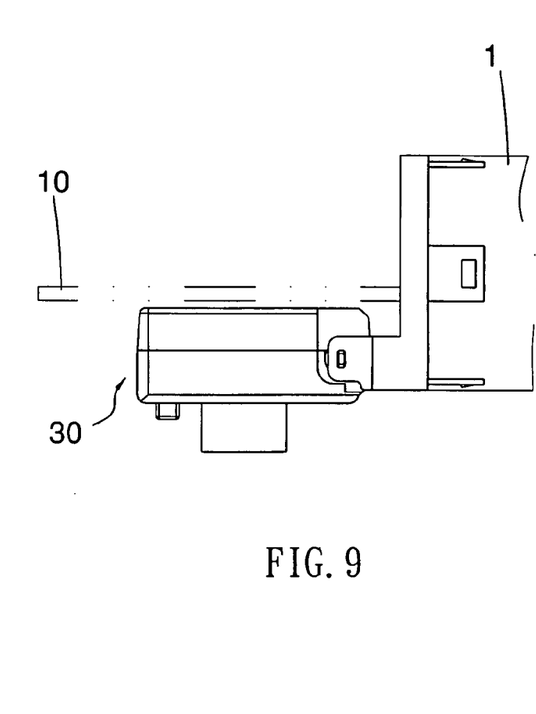
FIG. 9 is a schematic operational view of the multi-media player as shown in FIG. 8.

As shown in FIGS. 7–9 with reference to FIGS. 1–6, when the casing 30 is located at the first position as shown in FIG. 7, the second plate 32 of the casing 30 is rested on the mounting plate 20 rigidly and stably as shown in FIG. 1.

When the casing 30 is moved outward relative to the mounting plate 20 to move to the second position as shown in FIG. 9, the second plate 32 of the casing 30 is removed from the mounting plate 20 to wholly expose the window of the mounting plate 20, so that the receiving portion 10 of the main frame is moved outward from the window 21 as shown in FIGS. 2 and 9.

At this time, the elastic member 42 is distorted during movement of the casing 30 to store a restoring force. Thus, when the receiving portion 10 of the main frame 1 is retracted into the window 21 of the mounting plate 20, the casing 30 is moved toward the mounting plate 20 by the restoring force of the elastic member 42, so that the casing 30 is moved from the second position as shown in FIG. 9 to the first position as shown in FIG. 7 to return to the original state.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A multi-media player, comprising:
a main frame; and
a rotatable panel rotatably mounted on the main frame and including:
    a mounting plate secured on the main frame and formed with a window; and
    a casing rotatably mounted on the mounting plate and rotatable between a first position where the casing is rested on the mounting plate and a second position where the casing is removed from the mounting plate to expose the window of the mounting plate, wherein when the casing is moved from the first position to the second position, the casing stores a restoring force to provide an automatic restoring function, and wherein the casing includes a first plate, a second plate combined with the first plate, and an electronic device mounted between the first plate and the second plate, the electronic device including a circuit board electrically connected to the main frame, an indicator mounted on the circuit board, and two control switches mounted on the circuit board.

2. The multi-media player in accordance with claim 1, wherein the first plate of the casing is formed with a window, and the indicator is flush with the window of the first plate.

3. The multi-media player in accordance with claim 1, wherein the first plate is formed with two through holes for mounting the two control switches.

4. A multi-media player, comprising:
a main frame: and
a rotatable panel rotatably mounted on the main frame and including:
    a mounting plate secured on the main frame and formed with a window: and
    a casing rotatably mounted on the mounting plate and rotatable between a first position where the casing is rested on the mounting plate and a second position where the casing is removed from the mounting plate to expose the window of the mounting plate, wherein when the casing is moved from the first position to the second position, the casing stores a restoring force to provide an automatic restoring function, wherein the casing includes a first plate, a second plate combined with the first plate, and an electronic device mounted between the first plate and the second plate;

wherein the mounting plate is formed with two opposite mounting portions each formed with a mounting recess, and the rotatable panel further includes two connecting portions each secured on a respective one of the two mounting portions of the mounting plate and each including a first block formed with a fixing hole, and a second block integrally formed on the first block and inserted into the mounting recess a respective one of the two mounting portions.

5. The multi-media player in accordance with claim 4, wherein the fixing holes of the first blocks of the two connecting portions are coaxial with each other.

6. The multi-media player in accordance with claim 4, wherein the rotatable panel further includes two restoring devices each mounted between the first plate of the casing and a respective one of the two connecting portions to provide a restoring effect to return the casing to the original position.

7. The multi-media player in accordance with claim 6, wherein the first plate is formed with two opposite fixing members each formed with a plurality of fixing recesses, and each of the two restoring devices includes a shaft fixed on a respective one of the two connecting portions, a rotation barrel secured on a respective one of the two fixing members of the first plate and rotatably mounted on the shaft, and an elastic member mounted in the shaft and urged between the rotation barrel and the shaft.

8. The multi-media player in accordance with claim 7, wherein the shaft has a distal end formed with a plug protruded outward from the fixing barrel and fixed in the fixing hole of a respective one of the two connecting portions.

9. The multi-media player in accordance with claim 7, wherein the rotation barrel has a periphery formed with a plurality of fixing blocks each fixed in a respective one of the fixing recesses of the respective fixing member of the first plate.

10. The multi-media player in accordance with claim 7, wherein the shaft has an inside formed with a chamber for receiving the elastic member and has a periphery formed with a plurality of though holes each communicating with the chamber.

11. The multi-media player in accordance with claim 10, wherein the rotation barrel is formed with an opening for receiving the shaft.

12. The multi-media player in accordance with claim 11, wherein the chamber of the shaft has an end face formed with a fixing groove, the opening of the rotation barrel has an end face formed with a fixing stud formed with a fixing groove, and the elastic member has a first end fixed in the fixing groove of the shaft and a second end fixed in the fixing groove of the rotation barrel.

13. The multi-media player in accordance with claim 7, wherein each of the two restoring devices further includes a viscous body mounted between the rotation barrel and the shaft, a cover fixed in the opening of the rotation barrel to rotate therewith and formed with a though hole for passage of the plug of the shaft, and an O-ring urged between the rotation barrel and the shaft to seal the viscous body.

14. The multi-media player in accordance with claim 13, wherein the cover has an inner wall formed with two opposite positioning blocks, and the shaft has a periphery formed with two opposite catch blocks to stop movement of the positioning blocks of the cover to prevent the elastic member from being deformed excessively due to an excessive rotation of the rotation barrel.

* * * * *